US009108351B2

(12) United States Patent
Nakamatsu et al.

(10) Patent No.: US 9,108,351 B2
(45) Date of Patent: Aug. 18, 2015

(54) METHOD FOR FORMING ANODIZED LAYER, METHOD FOR PRODUCING MOLD AND METHOD FOR PRODUCING ANTIREFLECTIVE FILM

(75) Inventors: Kenichiro Nakamatsu, Osaka (JP); Hidekazu Hayashi, Osaka (JP); Kiyoshi Minoura, Osaka (JP); Akinobu Isurugi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 364 days.

(21) Appl. No.: 13/583,399

(22) PCT Filed: Mar. 8, 2011

(86) PCT No.: PCT/JP2011/055364
§ 371 (c)(1),
(2), (4) Date: Sep. 7, 2012

(87) PCT Pub. No.: WO2011/111697
PCT Pub. Date: Sep. 15, 2011

(65) Prior Publication Data
US 2012/0325670 A1  Dec. 27, 2012

(30) Foreign Application Priority Data
Mar. 9, 2010 (JP) .................................. 2010-052304

(51) Int. Cl.
*B29C 33/42* (2006.01)
*C25D 11/12* (2006.01)
(Continued)

(52) U.S. Cl.
CPC ............. *B29C 45/372* (2013.01); *B29C 33/565* (2013.01); *C25D 11/045* (2013.01);
(Continued)

(58) Field of Classification Search
CPC ....... C25D 11/02–11/34; B29C 33/42–33/428; G02B 1/11–1/118
USPC .................................................. 205/324–332
See application file for complete search history.

(56) References Cited

U.S. PATENT DOCUMENTS 3,864,217 A * 2/1975 Takahata et al. .............. 438/635
6,359,735 B1   3/2002 Gombert et al.
(Continued)

FOREIGN PATENT DOCUMENTS

JP    08144097 A    6/1996
JP    10324998 A    12/1998
(Continued)

OTHER PUBLICATIONS

International Preliminary Report on Patentability dated Oct. 11, 2012.
(Continued)

*Primary Examiner* — James Lin
*Assistant Examiner* — Ho-Sung Chung
(74) *Attorney, Agent, or Firm* — Harness, Dickey & Pierce, P.L.C.

(57) ABSTRACT

An anodized layer formation method of an embodiment of the present invention includes the step a of providing an aluminum film which is formed on a first principal surface of a support and the step b of anodizing a surface of the aluminum film to form a porous alumina layer which has a plurality of minute recessed portions. In the step a, a second principal surface of the support which is opposite to the first principal surface is provided with a low heat conduction member that has a predetermined pattern. According to an embodiment of the present invention, a porous alumina layer can be formed which includes regions of different minute structures in the predetermined pattern.

5 Claims, 4 Drawing Sheets

(51) Int. Cl.
  *G02B 1/11* (2006.01)
  *B29C 45/37* (2006.01)
  *C25D 11/18* (2006.01)
  *G02B 1/118* (2015.01)
  *C25D 11/16* (2006.01)
  *B29C 33/56* (2006.01)
  *C25D 11/04* (2006.01)

(52) U.S. Cl.
  CPC ............... *C25D 11/12* (2013.01); *C25D 11/16* (2013.01); *C25D 11/18* (2013.01); *G02B 1/118* (2013.01); *B29C 33/424* (2013.01)

(56) References Cited

U.S. PATENT DOCUMENTS

| | | |
|---|---|---|
| 2003/0205475 A1 | 11/2003 | Sawitowski |
| 2004/0163441 A1 | 8/2004 | Sawitowski |
| 2007/0159698 A1 | 7/2007 | Taguchi et al. |
| 2007/0235342 A1 | 10/2007 | Matsuo et al. |
| 2008/0121528 A1 | 5/2008 | Bench et al. |
| 2010/0243458 A1 | 9/2010 | Kojima et al. |
| 2011/0297640 A1 | 12/2011 | Isurugi et al. |
| 2012/0018613 A1 | 1/2012 | Hayashi et al. |

FOREIGN PATENT DOCUMENTS

| | | |
|---|---|---|
| JP | 2001517319 A | 10/2001 |
| JP | 2003531962 A | 10/2003 |
| JP | 2005156695 A | 6/2005 |
| TW | 200940320 A | 10/2009 |
| WO | WO-2006059686 A1 | 6/2006 |
| WO | WO-2010095415 A1 | 8/2010 |
| WO | WO-2010116728 A1 | 10/2010 |

OTHER PUBLICATIONS

International Search Report PCT/ISA/210 for International Application No. PCT/JP2011/055364 dated Jun. 6, 2011.

* cited by examiner (a)　　　　　　　(b)

(a)　　　　　　　(b)

(a)

(b)

(c)

(a)

(b)

(c)

METHOD FOR FORMING ANODIZED LAYER, METHOD FOR PRODUCING MOLD AND METHOD FOR PRODUCING ANTIREFLECTIVE FILM

TECHNICAL FIELD

The present invention relates to an anodized layer formation method, a mold manufacturing method, and a mold. In this specification, the "mold" includes molds that are for use in various processing methods (stamping and casting), and is sometimes referred to as a stamper. The mold can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. A base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the layer surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The applicant of the present application discloses, in Patent Document 4, the technique of forming an antireflection film with the use of an alumina layer in which very small recessed portions have stepped lateral surfaces.

Utilizing an anodized porous aluminum film can facilitate the manufacture of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film production method with the use of a moth-eye mold uses a photocurable resin. Firstly, a photocurable resin is applied over a substrate. Then, an uneven surface of a moth-eye mold which has undergone a mold release treatment is pressed against the photocurable resin in vacuum. Thereafter, the uneven structure is filled with the photocurable resin. Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of producing an antireflection film with the use of the photocurable resin is disclosed in, for example, Patent Document 4.

CITATION LIST

Patent Literature

Patent Document 1: Japanese PCT National Phase Laid-Open Publication No. 2001-517319

Patent Document 2: Japanese PCT National Phase Laid-Open Publication No. 2003-531962

Patent Document 3: Japanese Laid-Open Patent Publication No. 2005-156695

Patent Document 4: WO 2006/059686

Patent Document 5: Japanese Laid-Open Patent Publication No. 8-144097

SUMMARY OF INVENTION

Technical Problem

As conventionally known in the art, the structure of a porous alumina layer depends on the temperature of an electrolytic solution in the process of anodization. Also, due to the Joule's heat generated in the process of anodization, the temperatures of the aluminum base and the electrolytic solution vary. Therefore, to form a porous alumina layer which has a uniform structure, precisely controlling the temperatures is important. For example, Patent Document 5 discloses a temperature controlling method by means of directly cooling the aluminum base, independently of the temperature control of the electrolytic solution.

One of the major objects of the present invention is to provide a novel anodized layer formation method for forming a porous alumina layer which includes regions of different minute structures (e.g., different micropore depths) in a predetermined pattern, by utilization of the fact that the structure of the porous alumina layer depends on the temperature in the process of anodization.

Solution to Problem

An anodized layer formation method of the present invention includes the steps of: (a) providing an aluminum film which is formed on a first principal surface of a support, a second principal surface of the support which is opposite to the first principal surface being provided with a low heat conduction member that has a predetermined pattern; and (b) anodizing a surface of the aluminum film to form a porous alumina layer which has a plurality of minute recessed portions. In step (a), either of the step of forming the aluminum film on the first principal surface of the support or the step of providing the second principal surface of the support with the low heat conduction member may precede the other.

In one embodiment, the method further includes (c) after step (b), bringing the porous alumina layer into contact with an etching solution to enlarge the plurality of minute recessed portions of the porous alumina layer, and (d) after step (c), further performing anodization to grow the plurality of minute recessed portions.

In one embodiment, the predetermined pattern represents information. The predetermined pattern includes a character, a figure, or a symbol, or a combination thereof.

In one embodiment, step (a) includes providing the support which includes a base and an inorganic underlayer formed on a surface of the base, a surface of the inorganic underlayer being the first principal surface, forming an aluminum layer on the inorganic underlayer, forming a natural oxide film on a surface of the aluminum layer, and forming the aluminum film on a surface of the natural oxide film. Preferably, step (a) further includes forming an aluminum oxide layer between the inorganic underlayer and the aluminum layer.

In one embodiment, step (a) includes providing the support which includes a base and an inorganic underlayer formed on a surface of the base, a surface of the inorganic underlayer being the first principal surface, forming a buffer layer which contains aluminum on the inorganic underlayer, and forming the aluminum film on a surface of the buffer layer. Preferably, the buffer layer contains aluminum and oxygen or nitrogen and has a profile such that the aluminum content is higher on the porous alumina layer side than on the inorganic underlayer side.

A mold manufacturing method of the present invention is a method for manufacturing a mold which has an inverted moth-eye structure over its surface, including the step of forming a porous alumina layer according to any of the above-described anodized layer formation methods, the porous alumina layer having a plurality of minute recessed portions whose two-dimensional size viewed in a direction normal to the surface is not less than 10 nm and less than 500 nm.

An antireflection film production method of the present invention includes the steps of: providing a mold which is manufactured according to the above-described manufacturing method and a work; and irradiating a UV-curable resin provided between the mold and a surface of the work with ultraviolet light supplied through the mold, thereby curing the UV-curable resin.

In an antireflection film which is produced according to the production method of the present invention, a plurality of minute raised portions whose two-dimensional size viewed in a direction normal to the surface of the film is not less than 10 nm and less than 500 nm forms the predetermined pattern. The predetermined pattern can be perceived by a human eye because of the difference in spectral reflectance in the visible light range, which is attributed to the difference in the structure (height) of minute raised portions.

Advantageous Effects of Invention

According to the present invention, a novel anodized layer formation method is provided for forming a porous alumina layer which includes regions of different minute structures (e.g., different micropore depths) in a predetermined pattern. This anodized layer can be used as, for example, a mold for producing an antireflection film.

DESCRIPTION OF EMBODIMENTS

Figure 1:
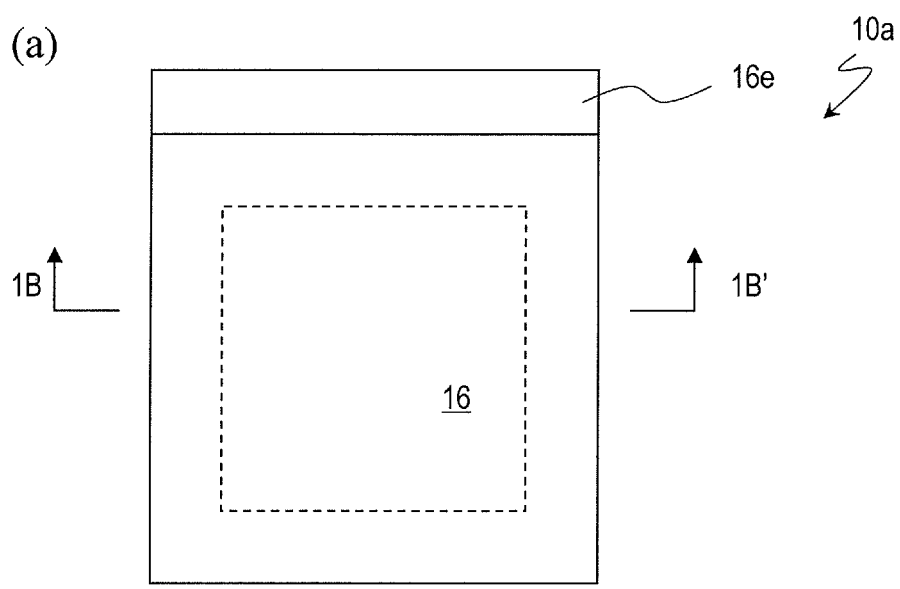
FIGS. 1(a) and (b) are diagrams schematically showing the state of an aluminum film which is to be subjected to an anodization step in an anodized layer formation method of an embodiment of the present invention. (a) is a plan view. (b) is a cross-sectional view taken along line 1B-1B' of (a).
Figure 1:
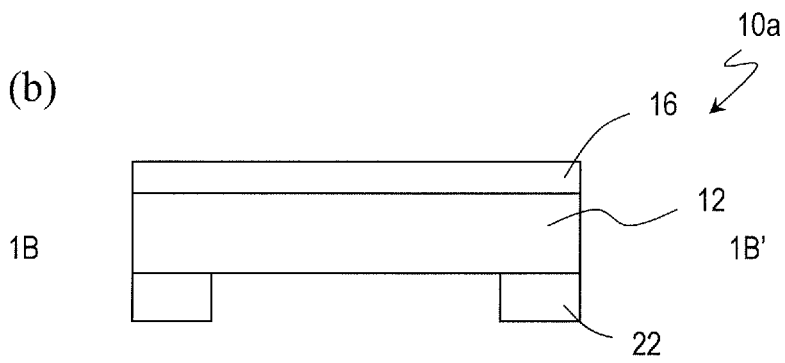

Hereinafter, an anodized layer formation method of an embodiment of the present invention is described with reference to the drawings. However, the present invention is not limited to the embodiment which will be exemplified below.

The present inventor noticed that the structure of a porous alumina layer depends on the temperature in the process of anodization, and positively utilized this phenomenon to arrive at a method for forming a porous alumina layer which includes regions of different minute structures (e.g., different depths of minute recessed portions) in a predetermined pattern. Thus, according to an anodized layer formation method of an embodiment of the present invention, it is possible to form a porous alumina layer which includes regions of different minute structures (e.g., different depths of minute recessed portions) in a predetermined pattern. In the following sections, an embodiment of the present invention will be described with examples of a method for forming an anodized layer that can be used as a mold of an antireflection film.

An anodized layer formation method of an embodiment of the present invention includes the step of providing an aluminum film formed on the first principal surface of a support and the step of anodizing a surface of the aluminum film to form a porous alumina layer which has a plurality of minute recessed portions. Here, during the anodization, a second principal surface of the support which is opposite to the first principal surface is provided with a low heat conduction member that has a predetermined pattern. As a result, a porous alumina layer is obtained in which a region whose minute structure (e.g., the depth of minute recessed portions) is different from the other regions is formed according to the pattern of the low heat conduction member.

An anodized layer formation method of an embodiment of the present invention is described in detail with reference to FIG. 1 and FIG. 2.

FIGS. 1(a) and 1(b) are diagrams schematically showing the state of an aluminum film which is to be subjected to an anodization step in an anodized layer formation method of an embodiment of the present invention. FIG. 1(a) is a plan view. FIG. 1(b) is a cross-sectional view taken along line 1B-1B' of FIG. 1(a).

The aluminum film 16, which is provided on a support 12 of a material piece 10a as shown in FIGS. 1(a) and 1(b), is subjected to the anodization step. In other words, the aluminum film 16 is provided on the first principal surface (front side) of the support 12. The support 12 may be, for example, a glass substrate or a plastic substrate.

On the second principal surface (rear side) of the support 12 which is opposite to the first principal surface, a low heat conduction member 22 which has a predetermined pattern is provided. Here, the low heat conduction member 22 has a frame-like pattern along the perimeter of the rectangular support 12. The low heat conduction member 22 may be an element which is capable of reducing the speed of release of the Joule's heat generated in the process of anodization to the electrolytic solution. The low heat conduction member 22 may be made of an insulating material (e.g., glass or plastic) as is the support 12.

The upper end of the aluminum film 16 is provided with an electrode pull-out section 16e. This section is not to be in contact with the electrolytic solution and is coupled to the positive electrode of an external power supply which is used for anodization. As the electrode pull-out method, a method described in PCT/JP2010/000937 of the applicant of the present application may preferably be used.

The surface of the aluminum film 16 is anodized with the material piece 10a being immersed in a predetermined electrolytic solution, whereby a porous alumina layer is formed which has a plurality of minute recessed portions. In this process, the Joule's heat is generated along with the advancement of the anodization. The Joule's heat is transferred from the aluminum film 16 and the formed porous alumina layer to the electrolytic solution and, meanwhile, transferred to the electrolytic solution via the support 12.

Here, the low heat conduction member 22, which is provided on the rear side of the support 12, functions to prevent the Joule's heat generated on the front side of the support 12 from being transferred via the support 12 to the electrolytic solution which is on the rear side of the support 12. Thus, the heat is likely to reside in a portion of the support 12 on which the low heat conduction member 22 is provided. As a result, the portion of the support 12 on which the low heat conduction member 22 is provided has a higher temperature than the other portion.

Accordingly, as a matter of course, a portion of the aluminum film 16 (or porous alumina layer) corresponding to the portion of the support 12 on which the low heat conduction member 22 is provided also has a higher temperature than the other portion of the aluminum film 16. Since the structure of the porous alumina layer also depends on the temperature in the process of anodization (the temperature of the electrolytic solution), a porous alumina layer of a varying structure is formed according to a pattern of the temperature distribution which is formed by the low heat conduction member 22.

For example, as described in Patent Documents 2 and 4 identified above, after the step of anodizing the surface of the aluminum film to form a porous alumina layer, the step of bringing the porous alumina layer into contact with an etching solution to enlarge the plurality of minute recessed portions of the porous alumina layer and the step of further performing anodization to grow the plurality of minute recessed portions of the porous alumina layer are performed, whereby a porous alumina layer can be formed which can be suitably used as a moth-eye mold for production of an antireflection film. For example, by alternately repeating the anodization step and the etching step through multiple cycles (e.g., 5 cycles: including 5 anodization cycles and 4 etching cycles), a moth-eye mold 10 can be obtained as shown in FIGS. 2(a) and 2(b).

FIGS. 2(a) and 2(b) are diagrams schematically showing the moth-eye mold 10 that includes a porous alumina layer 18 which is formed according to an anodized layer formation method of an embodiment of the present invention. FIG. 2(a) is a plan view. FIG. 2(b) is a cross-sectional view taken along line 2B-2B' of FIG. 2(a).

The moth-eye mold 10 has the porous alumina layer 18 as shown in FIG. 2(b), which is formed by anodizing part of the surface of the aluminum film 16. On the lower side (the support 12 side) of the porous alumina layer 18, an aluminum layer 16a is remaining. Note that the porous alumina layer 18 includes a porous layer which has minute recessed portions and a barrier layer which is provided on the lower side (the aluminum layer 16a side) of the porous layer.

The porous alumina layer 18 has a minute structure which varies depending on the type of the electrolytic solution, the applied voltage, and the temperature. This minute structure is characterized by the depth and diameter of the minute recessed portions and the distance between adjacent minute recessed portions (the "pitch" of the minute recessed portions when they are regularly arranged). As described above, even when the temperature of the electrolytic solution is maintained constant, the aluminum film 16 and the porous alumina layer 18, in which the anodization advances, have a nonuniform temperature distribution due to the support 12 and the low heat conduction member 22. As a result, the porous alumina layer 18 includes, for example, first recessed portions 18pa and second recessed portions 18pb which have different depths. Here, in a region 18b corresponding to a region in which the low heat conduction member 22 is provided on the rear side of the support 12, the second recessed portions 18pb are provided which have a greater depth than the first recessed portions 18pa that are formed in the other region 18a. Separately, the present inventor examined the formation speed (depth/second) of the porous alumina layer with the electrolytic solution for the anodization at different temperatures and estimated from the results of the examination what temperature difference was produced by providing the low heat conduction member 22. The estimated difference was about 3° C.

As described above, only by providing the low heat conduction member 22 that has a predetermined pattern on the rear side of the support 12, the region 18b of the porous alumina layer 18 which has the different minute structure than the other region 18a can be formed according to the pattern of the low heat conduction member 22. Thus, according to the anodized layer formation method of the embodiment of the present invention, the region 18b can be formed so as to have a desired pattern only by changing the pattern of the low heat conduction member 22. For example, the predetermined pattern can represent information by forming a pattern which includes a character, a figure, or a symbol, or a combination thereof.

When an antireflection film is produced using the mold 10 that includes the porous alumina layer 18, the predetermined pattern can be perceived by a human eye because of the difference in spectral reflectance in the visible light range, which is attributed to the difference in the structure (height) of minute raised portions, as will be described later with experimental examples. Therefore, the information represented by the predetermined pattern is perceived by a person who observes the antireflection film. For example, characters which represent the name of a company, a logotype, a mark, or product management data which represents the production lot number, such as numerals and symbols, can be shown.

The anodized layer formation method of the embodiment of the present invention includes forming an aluminum film on a support, such as a glass substrate or a plastic substrate. Therefore, if the adhesion between the support and the aluminum film is insufficient, the aluminum film may peel off in the anodization step and/or the etching step or in the process of alternately repeating these steps. In view of such, it is preferred that an inorganic underlayer and a buffer layer containing aluminum are formed in this order on a substrate which is made of glass or plastic, and an aluminum film is formed on the buffer layer. The inorganic underlayer also functions to prevent dissolution of alkaline metal from the glass substrate, for example. The inorganic underlayer is preferably a silicon dioxide layer or a titanium oxide layer. The thickness of the inorganic underlayer is preferably not less than 100 nm and not more than 200 nm. The buffer layer has a profile such that the aluminum content is higher on the porous alumina layer side than on the inorganic underlayer side, such as the buffer layer described in WO 2010/116728. The thickness of the buffer layer is preferably not less than 100 nm and not more than 200 nm. The entire disclosure of WO 2010/116728 is incorporated by reference in this specification.

Further, it is preferred that an aluminum film is once formed on the buffer layer and the surface of the aluminum film is naturally oxidized before an aluminum film is formed on the natural oxide film. For example, with only the aluminum film, the etching solution may enter a gap between crystal grains that form the aluminum film, thereby forming a pinhole. By forming the natural oxide film, generation of a pinhole in the aluminum film can be prevented, and the adhesion can be improved.

In order to uniformly perform the anodization, the temperature distribution of the electrolytic solution is important. Specifically, when the low heat conduction member is not provided, it is necessary to form a porous alumina layer which has a uniform moth-eye structure over the entire surface. The present inventor carried out various experiments using a glass substrate of 65 inches on the diagonal and found that, when the upper edge of the base was at a depth of 20 cm or more from the solution surface of the electrolytic solution, a uniform moth-eye structure was formed over the entire surface, without being affected by the temperature distribution of the electrolytic solution (the temperature was higher near the solution surface). When the anodization is performed at a depth of 20 cm or more from the solution surface of the electrolytic solution, a porous alumina layer which has a uniform moth-eye structure over the entire surface can be formed without using a special apparatus such as those described in Japanese Laid-Open Patent Publication No. 10-324998 and Japanese Laid-Open Patent Publication No. 8-144097.

Hereinafter, the anodized layer formation method of the embodiment of the present invention is described with experimental examples.

In the experimental examples, a glass substrate and plastic substrates were used as the base. The plastic substrates used were a polyethylene terephthalate (PET) substrate and a triacetylcellulose (TAC) substrate. The substrates used herein were large-size substrates of 1 m×1.6 m. The thickness of the glass substrate was 2.8 mm. The thickness of the PET substrate was 188 µm. The thickness of the TAC substrate was 80 µm. The PET substrate and the TAC substrate were in the form of a film. If the substrates are solely immersed in the electrolytic solution or the etching solution, they will be deformed, e.g., warped, due to a convectional flow of the solution. In view of such, these plastic substrates (films) were adhered on the above-described glass substrate using a double-sided FIXFILM manufactured by FUJICOPIAN CO., LTD. ("FIXFILM" is the registered trademark of FUJICOPIAN CO., LTD.) before use. Using FIXFILM enables the plastic substrate to be detachably adhered to a smooth surface of the glass substrate, or the like, without using an adhesive agent (including a sticky agent).

Figure 3:
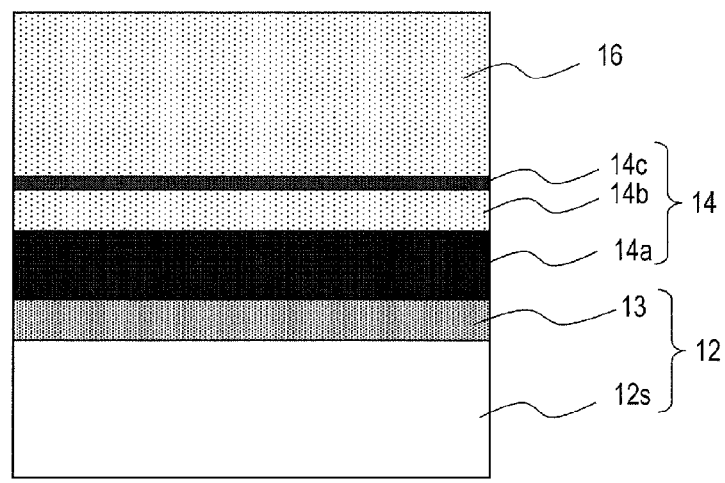
FIG. 3 A schematic cross-sectional view of a material piece which was used in an experimental example.

FIG. 3 is a schematic cross-sectional view of a material piece used in the experimental examples. As shown in FIG. 3, an inorganic underlayer 13, a buffer layer 14a, an aluminum underlayer 14b, and a natural oxide film 14c were formed on a base 12s, and thereafter, the aluminum film 16 was formed. Here, the set of the base 12s and the inorganic underlayer 13 is referred to as "support 12".

For example, a 150 nm thick $SiO_2$ layer 13 is formed on the glass substrate 12s by sputtering.

Then, a 300 nm thick aluminum oxide layer 14a is formed on the inorganic underlayer 13 by sputtering. The sputtering conditions were such that the B. G. vacuum degree was $1\times10^{-5}$ Torr, the atmospheric gas was Ar, the vacuum degree during the sputtering was $1\times10^{-3}$ Torr, and the Al target purity was 99.999%. The purity of the Al target may be not less than 99.99%. Note that 1 Torr is equal to $1.33322\times10^{-1}$ kPa. In the process of formation of the aluminum oxide layer 14a, the oxygen concentration is gradually decreased, whereby the aluminum oxide layer 14a is formed so as to have a profile such that the aluminum content is higher on the porous alumina layer side than on the inorganic underlayer side. Note that the aluminum oxide layer 14a may be an insulating element which has high acid resistance. For example, the aluminum oxide layer 14a may be an aluminum nitride layer.

Further, a 200 nm thick aluminum layer 14b is formed on the aluminum oxide layer 14a, and the surface of the aluminum layer 14b is naturally oxidized, whereby a natural oxide film 14c with a thickness of about 10 nm is formed. The set of the aluminum oxide layer 14a, the aluminum layer 14b, and the natural oxide film 14c is sometimes referred to as "aluminum-containing underlayer 14".

On the natural oxide film 14c, a 800 nm thick aluminum film 16 is formed by sputtering.

Thereafter, the anodization and the etching are repeatedly performed on the aluminum film 16, whereby a porous alumina layer 18 is formed.

Figure 2:
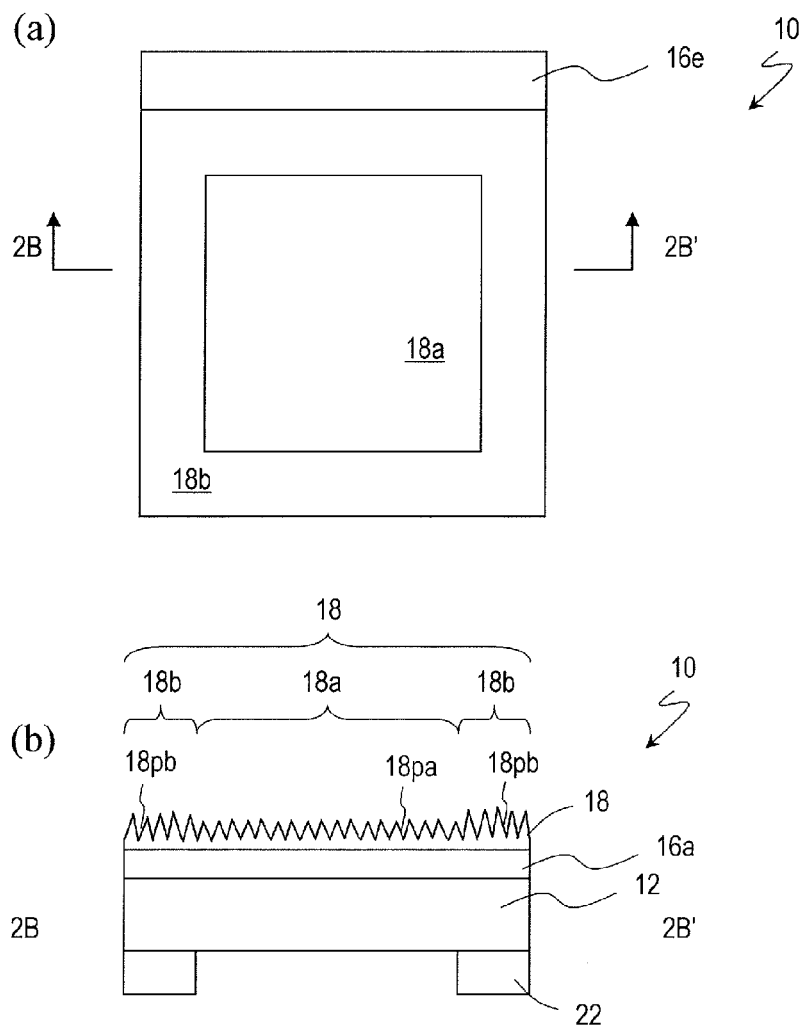
FIGS. 2(a) and (b) are diagrams schematically showing a moth-eye mold 10 that includes a porous alumina layer 18 which is formed according to an anodized layer formation method of an embodiment of the present invention. (a) is a plan view. (b) is a cross-sectional view taken along line 2B-2B' of (a).

An acrylic plate with the pattern shown in FIG. 1, which was provided as the low heat conduction member 22, was adhered to the rear surface of the support 12 shown in FIG. 3. On the thus-obtained material piece 10a, the anodization step and the etching step were performed through the following procedure.

The anodization was performed for 37 seconds with an applied voltage of 80 V using a 0.025 mol/L (liter) oxalic acid aqueous solution. After being water-washed by immersion in pure water, the material piece was etched for 29 minutes using a 1 mol/L phosphoric acid aqueous solution and then water-washed again. This cycle was repeated four times, and the anodization was again performed at the end. Note that the anodization was performed under the conditions that the electrolytic solution was set to 18° C., and the upper edge of the material piece 10a was placed at a depth of 20 cm or more from the solution surface of the electrolytic solution. The temperature of a surface of the material piece 10a which was on the aluminum film 16 side was 23° C. even in the fourth cycle of the anodization. This was not greatly different from the temperature of the electrolytic solution in the same cycle, which was 20° C. In a preparatory examination, it was confirmed that, the temperature of a surface of the material piece 10a which was on the aluminum film 16 side, and which was at the depth of 5 cm from the solution surface, had reached 40° C. in the second cycle of the anodization, but was generally equal to the solution temperature at depths of 20 cm or more from the solution surface. Note that the temperature of the etching solution was about 27° C. in either of the four cycles of the etching step.

During transfer of the material piece 10a from an electrolysis bath to a water-wash bath, during transfer from the water-wash bath to an etching bath, and during transfer from the etching bath to the water-wash bath, the material piece 10a was wet with the respective liquids (i.e., without being dried). This way of transfer enables to prevent a mist of a solvent from adhering on the surface of the material piece 10a. Since various types of solvents are used in the process, if different types of solvents adhere on the surface, they could not be removed in some cases.

Figure 4:
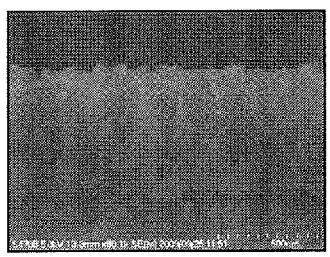
FIG. 4 Cross-sectional SEM images of the porous alumina layer 18 of the moth-eye mold 10. (a) is a cross-sectional view of a region 18b corresponding to a region in which a low heat conduction member 22 is provided on a rear side of a glass substrate 12. (b) is a cross-sectional view of a region 18a corresponding to a region in which the low heat conduction member 22 is not provided on the rear side of the glass substrate 12.
Figure 4:

Cross-sectional SEM images of the porous alumina layer 18 of the moth-eye mold 10 (see FIG. 2) that was obtained as described above are shown in FIGS. 4(a) and 4(b). FIG. 4(a) is a cross-sectional view of a region 18b of the porous alumina layer 18 corresponding to a region in which the low heat conduction member (acrylic plate) 22 is provided on the rear side of the glass substrate 12. FIG. 4(b) is a cross-sectional view of a region 18a of the porous alumina layer 18 corresponding to a region in which the low heat conduction member (acrylic plate) 22 is not provided on the rear side of the glass substrate 12.

The average depth of micropores shown in FIG. 4(a) (recessed portions 18pb in FIG. 2(b)) was 510 nm. The average depth of micropores shown in FIG. 4(b) (recessed portions 18pa in FIG. 2(b)) was 410 nm. The diameters of the both micropores were about 180 nm, between which no significant difference was found.

Figure 5:
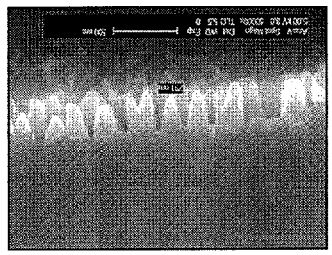
FIGS. 5(a) and (b) are cross-sectional SEM images of an antireflection film which was produced using the moth-eye mold 10 of an embodiment of the present invention. (a) and (b) correspond to the regions shown in FIG. 4(a) and FIG. 4(b), respectively.
Figure 5:
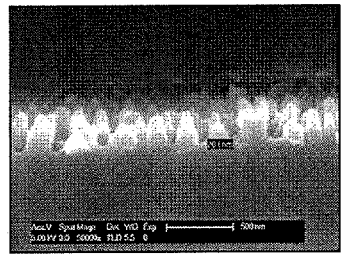

FIG. 5(a) and FIG. 5(b) are cross-sectional SEM images of an antireflection film which was produced using the above-described moth-eye mold 10. FIG. 5(a) and FIG. 5(b) correspond to the regions shown in FIG. 4(a) and FIG. 4(b), respectively. The antireflection film was produced as described below.

An UV-curable resin (40 μm thick) was applied over a TAC film (75 μm thick). Thereafter, the moth-eye mold 10 was pressed against the TAC film such that the gap between the moth-eye mold 10 and the surface of the TAC film was filled with the UV-curable resin. With this state being maintained, ultraviolet light was supplied through the TAC film so as to cure the UV-curable resin. The UV-curable resin used was an acrylic resin manufactured by DNP Fine Chemicals Co., Ltd.

The average height of the raised portions of the antireflection film shown in FIG. 5(a) was about 290 nm. The average height of the raised portions shown in FIG. 5(b) was about 200 nm. The fact that the height of the raised portions of the antireflection film is smaller than the depth of the recessed portions of the moth-eye mold is attributed to curing shrinkage of the UV-curable resin and insufficient filling of the micropores with the resin. By optimizing the mold release agent and/or increasing the pressure for pressing the moth-eye mold, a resultant antireflection film can have raised portions in which the shape and size of the recessed portions of the moth-eye mold are reflected.

Only by providing an acrylic substrate 22 of a predetermined pattern on the rear surface of the glass substrate 12 as described above before performing the anodization and etching steps in the conventional way, a porous alumina layer can be formed which includes regions of different micropore depths in a predetermined pattern. Using a moth-eye mold which includes a porous alumina layer that has such a structure enables to produce an antireflection film which includes regions of different raised portion structures in a predetermined pattern. This pattern can be perceived by a human eye due to a small difference in color.

Figure 6:
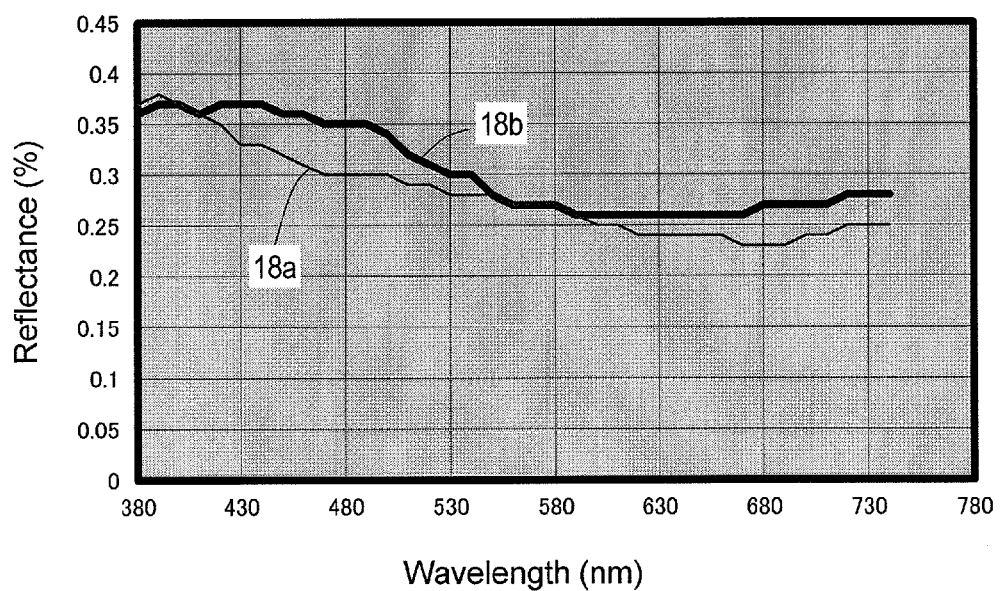
FIG. 6 A graph showing the measurement result of the spectral reflectance of the antireflection film which was produced using the moth-eye mold 10 of an embodiment of the present invention.

FIG. 6 shows the measurement result of the spectral reflectance of the above-described antireflection film. In FIG. 6, the measurement result for a region corresponding to the region shown in FIG. 5(a) (a region to which the region 18b of FIG. 2 was transferred) and the measurement result for a region corresponding to the region shown in FIG. 5(b) (a region to which the region 18a of FIG. 2 was transferred) are shown together. For the measurement of the spectral reflectance, the spectrocolorimeter CM-2600d manufactured by KONICA MINOLTA HOLDINGS, INC. was used. Here, the reflected light includes not only specular reflection but also scattered light from the antireflection film, for example, so that the reflectance of the vertical axis has a greater value than the specular reflectance.

As seen from FIG. 6, the two regions have different spectral reflectances for the visible light range. At around 480 nm, the spectral reflectance of the region to which the region 18b of the moth-eye mold 10 was transferred is greater than the spectral reflectance of the region to which the region 18a of the moth-eye mold 10 was transferred. When the antireflection film adhered on a black acrylic resin plate is observed by a human eye, the region to which the region 18b of the moth-eye mold 10 was transferred appears as having a yellowish green hue, and the region to which the region 18a of the moth-eye mold 10 was transferred appears as having a red hue. In either of the regions, the reflectance is not more than 0.4%, so that the antireflection film can sufficiently carry out its function. The minute structure of the porous alumina layer, for example, the depth of the micropores, the diameter of the micropores, the interval between adjacent micropores (the distance between the centers), and the regularity of the arrangement of the micropores vary depending on the type, concentration, and temperature of the electrolytic solution, the level of the applied voltage, the duration of application of the voltage, etc., and therefore may be regulated as necessary. The porous alumina layer 18 of the moth-eye mold 10 for production of an antireflection film preferably has such dimensions that the two-dimensional size (the diameter of the micropores) is not less than 10 nm and not more than 500 nm, the interval between adjacent micropores is also not less than 10 nm and not more than 500 nm, the depth of the micropores is not less than 100 nm and not more than 500 nm, and the distribution of the micropores has no regularity.

However, as apparent from the above descriptions, the minute structure of the porous alumina layer is affected by the heat releasability of the material piece 10a during the anodization. Therefore, if the heat conductivity of the material that forms the support 12 is different, the minute structure of the resultant porous alumina layer is also different, even when the electrolytic solution and the applied voltage are the same.

The anodization step and the etching step were performed using a glass substrate, a PET substrate, and a TAC substrate as the support 12 of the material piece 10a shown in FIG. 3 under the same conditions as those of the above-described experimental example, whereby porous alumina layers were formed. The results of the formation of the porous alumina layers are described below. As exemplified below, the minute structure of the porous alumina layer formed varies depending on the type of the base, i.e., the heat conductivity (heat releasability) of the base. Thus, not only the anodization conditions, such as the type, concentration, and temperature of the electrolytic solution, the level of the applied voltage, and the duration of application of the voltage, but also the type of the base need to be appropriately selected according to the desired minute structure.

Figure 7:
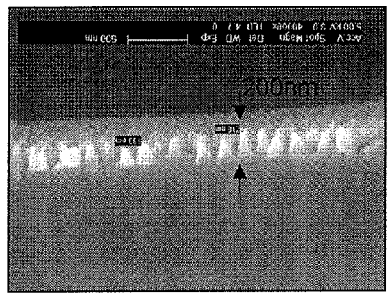
FIGS. 7(a) to (c) are cross-sectional SEM images of antireflection films which were produced using moth-eye molds that include porous alumina layers formed on a glass substrate, a PET substrate, and a TAC substrate, respectively.
Figure 7:
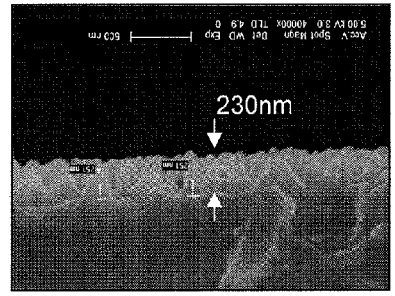
Figure 7:
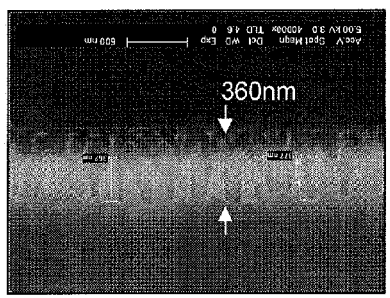

FIGS. 7(a) to 7(c) are cross-sectional SEM images of antireflection films which were produced according to the above-described method, using moth-eye molds that include porous alumina layers formed on a glass substrate, a PET substrate, and a TAC substrate, respectively.

The height of the raised portions of the antireflection film which was produced using the mold that has the glass substrate was about 200 nm. The height of the raised portions of the antireflection film which was produced using the mold that has the PET substrate was about 230 nm. The height of the raised portions of the antireflection film which was produced using the mold that has the TAC substrate was about 360 nm. The heat conductivities of the glass, the PET, and the TAC are 1.0 W/m·K, 0.20 to 0.33 W/m·K, and 0.17 to 0.33 W/m·K, respectively, at around the room temperature (25° C.). There is a tendency that a mold that has a base of smaller heat conductivity can produce an antireflection film which has higher raised portions. Specifically, as the heat conductivity of the base decreases, the Joule's heat generated during the anodization is likely to reside over the surface of the base so that the electrolytic reaction is enhanced. As a result, it is inferred that, a porous alumina layer with deeper micropores was formed.

Figure 8:
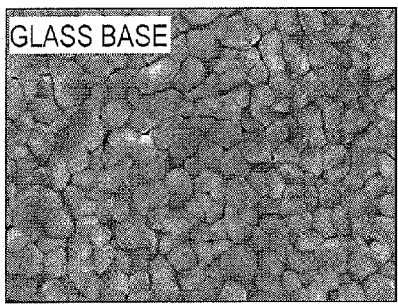
FIGS. 8(a) to (c) are SEM images of the surfaces of aluminum films deposited on a glass substrate, a PET substrate, and a TAC substrate, respectively.
Figure 8:
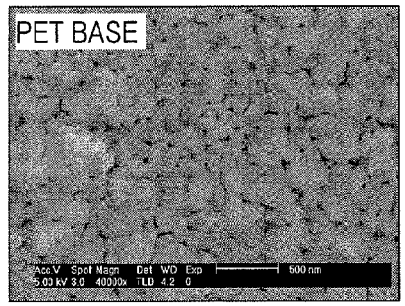
Figure 8:
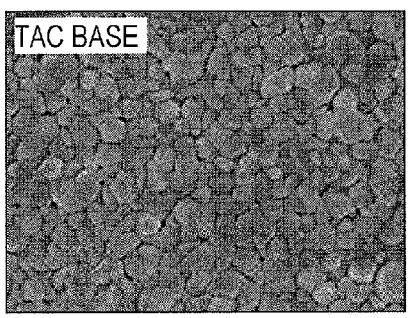

If the type of the base varies, the form of the aluminum film deposited on the base also varies. FIGS. 8(a) to 8(c) are SEM images of the surfaces of aluminum films deposited on a glass substrate, a PET substrate, and a TAC substrate, respectively. The same film formation conditions were employed for all the aluminum films such that the B. G. vacuum degree was $1 \times 10^{-5}$ Torr, the atmospheric gas was Ar, the vacuum degree during the sputtering was $1 \times 10^{-3}$ Torr, and the Al target purity was 99.999%. The aluminum films had the same thickness, 1000 nm.

As seen from FIG. 8(a), the aluminum film deposited on the glass substrate has such a form that crystal grains aggregated relatively densely. The crystal grains have generally equal sizes although they have some variations. As seen from FIG. 8(b), the aluminum film deposited on the PET substrate has a relatively large number of pores between crystal grains (which are observed as small black spots). Further, the shape and size of the crystal grains have large variations, and therefore, it can be appreciated that the surface has roughness. As seen from FIG. 8(c), the aluminum film deposited on the TAC base has a similar form to that of the aluminum film deposited on the glass substrate. The aluminum film deposited on the TAC base has a slightly larger number of pores between crystal grains than the aluminum film deposited on the glass substrate.

Thus, it is inferred that, when the form of the aluminum film varies, the heat releasability during the anodization also varies. Therefore, it is inferred that the form of the aluminum film also affects the minute structure of the porous alumina layer. Thus, it is preferred that the effect of the type of the base on the minute structure of the porous alumina layer is ascertained beforehand according to the desired minute structure.

In the above embodiment, the example has been described in which an aluminum film formed on a base that has an insulating property is used. However, the embodiment of the present invention is not limited to that example. Aluminum films which are formed on various types of supports may be used. The shape of the support is not limited to the substrate but may be cylindrical. The material of the support may not have an insulating property. At least part of the surface of the support which is to be in contact with the aluminum film (first principal surface) may have an insulating property. For example, the support may be realized by forming an insulating film on the surface of a main body portion that is made of a metal material (e.g., stainless steel), and an aluminum film may be formed on the insulating film. The insulating film may be an inorganic insulating film which is made of an inorganic oxide or an inorganic nitride, or may be an organic insulating film.

However, since metal materials, such as stainless steel, have higher heat conductivity than insulating materials, the temperature distribution which is formed over the surface of the support during the anodization is small even when an insulating member is provided on the rear surface of the support (second principal surface). This tendency increases as the thickness of the main body portion that is made of a metal increases. Therefore, generally, the support is preferably made of an insulating material. The material preferably has tolerance for the electrolytic solution (and tolerance for the etching solution when necessary). According to the size of the support or the size and accuracy (line width) of the pattern to be formed, the support used may be a support which has a main body portion of a metal material.

INDUSTRIAL APPLICABILITY

The present invention is applicable to formation of an anodized porous alumina layer that is for use in various purposes.

REFERENCE SIGNS LIST 10 moth-eye mold
10a material piece
12 support
16 aluminum film
16e electrode pull-out section
18 porous alumina layer
22 low heat conduction member

The invention claimed is:

1. An anodized layer formation method, comprising the steps of:
   (a) providing an aluminum film which is formed on a first principal surface of a support, a second principal surface of the support which is opposite to the first principal surface being provided with a low heat conduction member that has a predetermined pattern,
   providing the support which includes a base and an inorganic underlayer formed on a surface of the base, a surface of the inorganic underlayer being the first principal surface,
   forming an aluminum layer on the inorganic underlayer, forming a natural oxide film on a surface of the aluminum layer, and
   forming the aluminum film on a surface of the natural oxide film; and
   (b) anodizing a surface of the aluminum film to form a porous alumina layer that includes a first region and a second region which have a plurality of minute recessed portions, the second region having a pattern formed according to the predetermined pattern and the plurality of minute recessed portions in the second region having structures different from the plurality of minute recessed portions in the first region.

2. The anodized layer formation method of claim 1, further comprising
   (c) after step (b), bringing the porous alumina layer into contact with an etching solution to enlarge the plurality of minute recessed portions of the porous alumina layer, and
   (d) after step (c), further performing anodization to grow the plurality of minute recessed portions.

3. The anodized layer formation method of claim 1, wherein the predetermined pattern represents information.

4. A method for manufacturing a mold which has an inverted moth-eye structure over its surface, comprising the step of forming a porous alumina layer according to the anodized layer formation method as set forth in claim 1, the porous alumina layer having a plurality of minute recessed portions whose two-dimensional size viewed in a direction normal to the surface is not less than 10 nm and less than 500 nm.

5. A method for producing an antireflection film, comprising the steps of:
   providing a mold which is manufactured according to the manufacturing method as set forth in claim 4 and a work; and
   irradiating a UV-curable resin provided between the mold and a surface of the work with ultraviolet light supplied through the mold, thereby curing the UV-curable resin.

* * * * *